Nov. 25, 1930.   L. A. SHARP   1,782,548
DUCT END OUTLET ALIGNING MEANS
Filed May 14, 1929   2 Sheets-Sheet 1
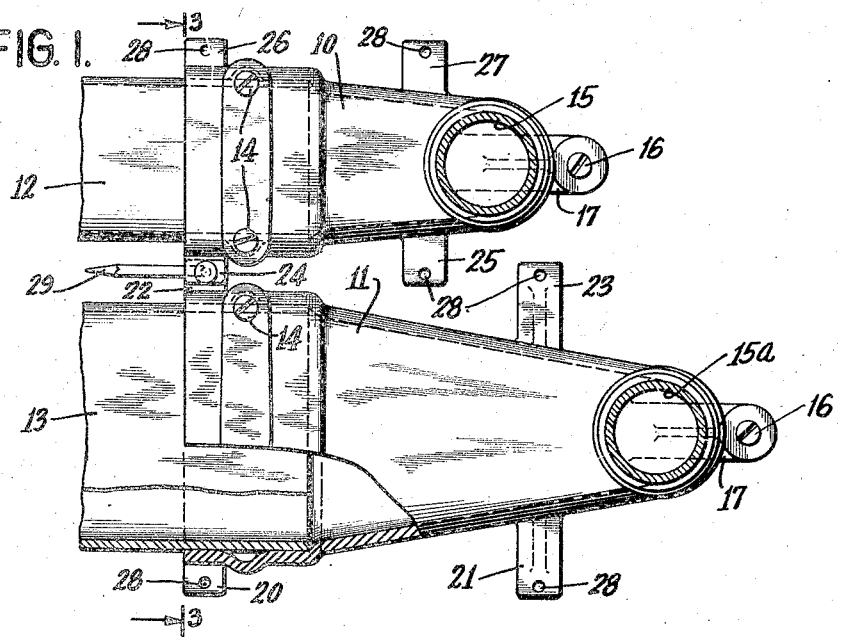
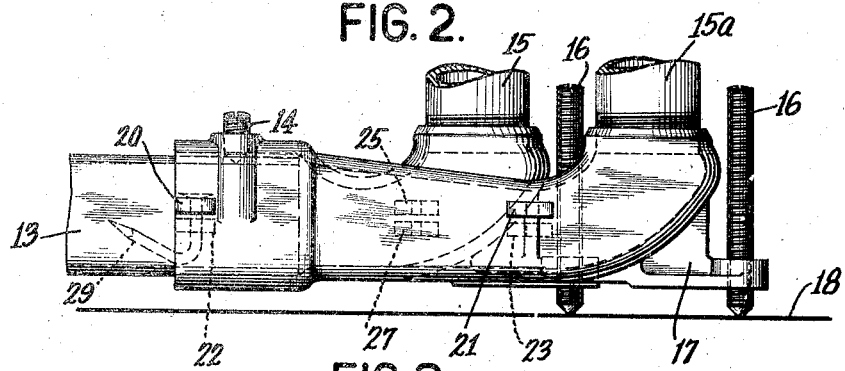
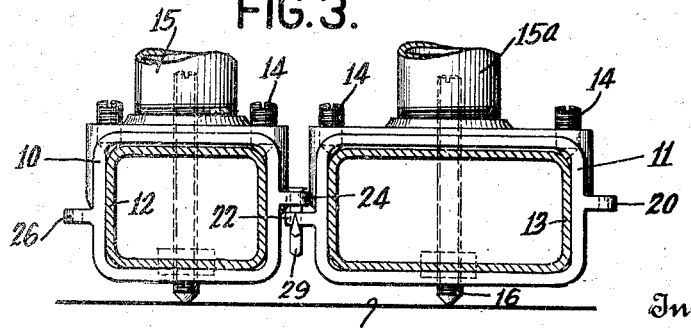
Inventor
L. Alan Sharp
By his Attorneys.
Cooper, Kerr & Dunham

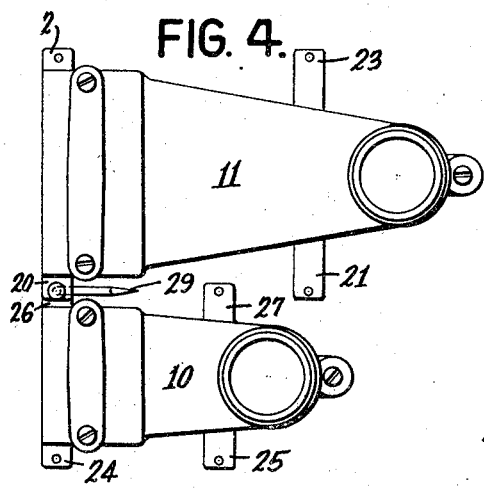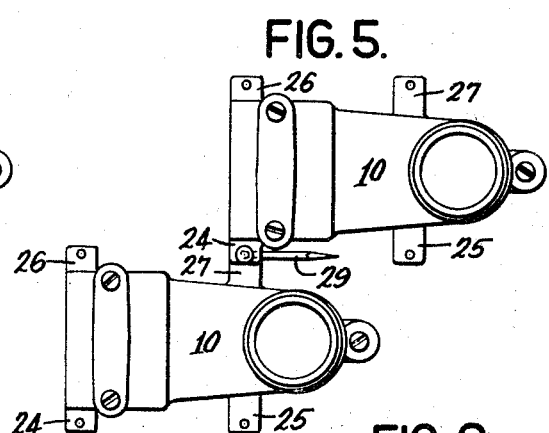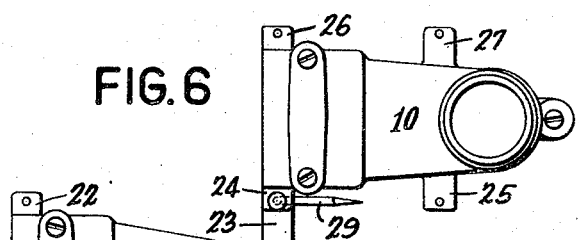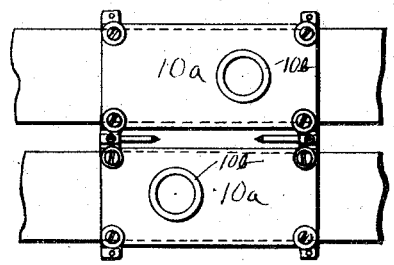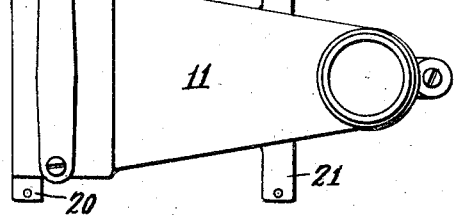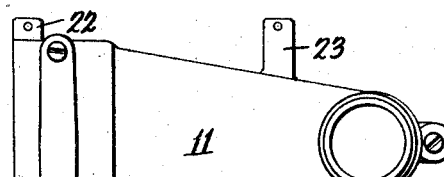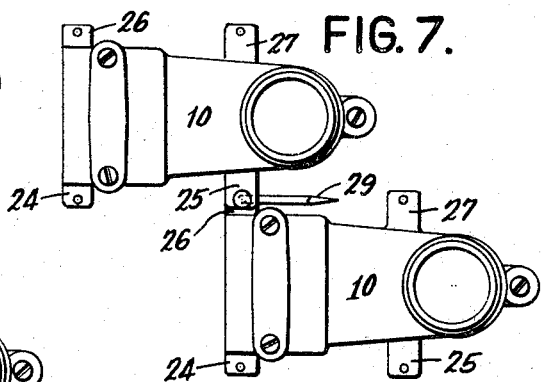

Patented Nov. 25, 1930

1,782,548

UNITED STATES PATENT OFFICE

L. ALAN SHARP, OF AVALON, PENNSYLVANIA, ASSIGNOR TO NATIONAL ELECTRIC PRODUCTS CORPORATION, OF NEW YORK, N. Y., A CORPORATION OF DELAWARE

DUCT-END OUTLET-ALIGNING MEANS

Application filed May 14, 1929. Serial No. 362,906.

In electrical distribution systems, conduits are frequently employed through which conductors are passed and such conduits are frequently provided with fittings such as elbows or other outlets to connect certain runs of conduit with other runs of conduit or with other outlet connections. Frequently several runs of conduit are disposed side by side and it is desirable that provision be made for maintaining parallelism of adjacent conduit runs and for aligning the fittings or outlet parts.

In practice occasion frequently arises for variously disposing the fittings or outlet parts with respect to each other in order that they may accommodate varied positions of the cooperating conduits.

The present invention relates to improved outlet or aligning means which will provide for extensive variation of the relative location or inter-relation of pairs of or a plurality of cooperating fittings or outlet parts with respect to each other, and at the same time provide a simple means for connecting together adjacent fittings or outlet parts.

A further object of the present invention resides in the provision of suitable means upon the fittings to provide for an inter-connection and aligning of one fitting with an adjacent fitting in such a way that the adjacent fitting may be optionally disposed to either side of the first mentioned fitting or outlet part.

A further object of the present invention resides in the provision of fittings for outlet parts having means thereon to provide for an inter-connection and alignment and inter-relation of one fitting with adjacent fittings or outlet parts with variable lengthwise relative locations upon the cooperating fittings or outlet parts.

A further object of the present invention resides in the provision of lug-like extensions upon fittings or outlet parts, such extensions upon certain sides of the fittings being disposed upon one level and the extensions upon the other side of the same fitting being disposed at a different level so that one lug on one fitting may extend over and mate with the lug of an adjacent fitting when an inter-connection and alignment is to be made between two or more of such fittings.

A further object resides in the provision of a plurality of such lugs on each fitting or outlet part upon one level at one side of each fitting and in the provision of another plurality of such lugs at a different level upon the other sides of the same fitting to provide for a variable relative alignment and mating of cooperating adjacent fittings.

Further and other objects of the present invention will be hereinafter set forth in the accompanying specification and claims and shown in the drawings which by way of illustration show certain improvements and what I now consider to be preferred embodiments of the invention.

In the drawings:

Figure 1 is a top plan view of a pair of adjacent fittings with the associated conduits shown as entering them and this figure shows the fittings inter-connected, interrelated and aligned in one optional manner;

Fig. 2 is a side elevational view of the part shown in Fig. 1;

Fig. 3 is a detail sectional view taken on line 3—3 of Fig. 1;

Figs. 4 to 8 inclusive show certain of the many varied optional ways in which fittings may be inter-connected, interrelated and aligned;

Figs. 9 and 10 show the invention wherein a different form of fitting is utilized.

In more detail in the drawings I have shown my improvements incorporated upon an elbow type or outlet part. It is obvious, however, that the invention is not limited to elbow type of fittings but can be used in connection with outlet parts or fittings or other forms and having other configurations.

In Figs. 1 and 2 of the drawings, 10 represents a short elbow fitting and 11 a relatively longer elbow or fitting. Each fitting 10 and 11 is provided with female couplings to receive the cooperating conduits. As shown, the horizontal conduits 12 and 13 are of substantially rectangular configuration and each of these conduits is held in the coupling parts by set screw means such as 14. The vertical conduits 15 and 15ª are shown as round pipe conduits and are provided with screw threads which are threaded into the threads in the female couplings of the fittings. Obviously various other types of conduit could be used and the connections from the conduits to the fittings could be made in any desired manner. I have also shown upon each fitting an adjustment stud 16 which is screw threaded into an extension 17 upon each fitting. This stud enables each fitting to be relatively vertically adjusted above a subfloor structure which is indicated at 18 in Fig. 2. Such adjustment stud per se forms the subject matter of a different invention of James M. G. Fullman, Serial No. 363,121, filed May 15, 1929, which application also discloses and claims certain of the features of the coupling devices which are herein disclosed.

As shown in Figs. 1 and 2, long fitting 11 is provided with two lug-like extensions 20 and 21 which extend out from one side of the fitting and upon the opposite side of the same fitting are other similar lug-like extensions 22 and 23. These latter extensions 22 and 23 are disposed on a different level than the levels of the lugs 20 and 21 (see Figs. 2 and 3). The short fitting 10 is similarly provided with lug-like extensions 24 and 25, such extensions being disposed upon the same relative level as the lugs 20 and 21 upon fitting 11. Upon the opposite side of fittings 10 are lug-like extensions 26 and 27 which are upon a different level than lugs 24 and 25 and which are upon the same relative level as the lugs 22 and 23 upon fitting 11. All of the various lugs are apertured as shown at 28 to permit any suitable connecting means to be passed through the apertures of two mating lugs for securing two adjacent fittings together. In practice, a nail such as 29 may be passed through the mating apertures of two mating lugs and afterwards the nail can be bent over as shown.

Figs. 1, 2 and 3 show one optional manner of inter-connecting and aligning two adjacent fittings. Here the lugs 24 and 21 are mated and the fastening nail 29 is passed through such lugs. This provides for the maintenance of the fitting parts and of the cooperating conduits in the relation which is shown in these figures.

Fig. 4 shows a different optional relation of the parts. Here the long fitting 11 is disposed upon the opposite side of the short fitting 10. This relation of the parts is the reverse to the arrangement shown in Figs. 1 to 3 inclusive. With this relative disposition of the parts the lug 26 upon fitting 10 is mated with and disposed below lug 20 upon the long fitting 11.

Fig. 5 shows another inter-relation of fittings 10. Here two short fittings 10 are employed and the lug 24 of one fitting 10 is mated up with the lug 27 of another short fitting 10. When the fittings are inter-related in the manner shown in Figs. 1 to 4 inclusive, the ends of the conduits 12 and 13 are in substantial alignment as shown. When the inter-relation of parts is used such as is shown in Fig. 5 and in the subsequent figures numbered 6 to 8 inclusive, the horizontal conduit runs are not in alignment but the ends are relatively staggered with respect to each other as will be readily understood.

Fig. 6 shows another inter-relation of the fittings in which the lug 23 of one long fitting 11 is mated up and connected to lug 24 of a short fitting 10.

Fig. 7 shows a different inter-relation of two short fittings 10. Here lug 25 of one fitting is mated and connected to lug 26 to another short fitting 10.

Fig. 8 shows a still different inter-relation which is the reverse to that shown in Fig. 6 with part 11 above and part 10 below. In this figure, lug 21 mates with and is connected to lug 26 upon the fitting 10. Various other inter-relation of the fittings also can be secured which need not be described or illustrated in detail. For example two of the long fittings might be disposed side by side and connected by attaching lug 22 of one long fitting to lug 20 of the adjacent fitting. If desired the lug 23 of one long fitting can be attached to mating lug 21 of an adjacent fitting. Also if desired two short fittings can be similarly inter-connected and aligned. Other alternative inter-connections and inter-relations can be made with two short fittings or two long fittings as will be readily understood.

By the provision of fittings of the character described, each provided with lugs on each side for mating with lugs on other fittings which are provided on each side of said fittings, a wide variety of inter-relation of fittings can be had with the minimum of parts. It is unnecessary to provide special fittings for various inter-relations of such fittings or of the conduits inasmuch as the construction permits a particular fitting to be used in a wide variety of ways.

In Fig. 9, two fittings 10$^a$ are shown. Such fittings 10$^a$ each having female coupling portions at their ends and each fitting being provided with an outlet neck as shown at 10$^b$ in the various figures. It is obvious that such fittings can be used in lieu of the fittings 10 and of course, other kinds of fittings can likewise be used. Such fittings 10$^a$ are provided with similar lugs for mating them with cooperating fittings, etc.

It will be understood that by the provision of my variably related fittings I am able to definitely locate the outlet part of such fitting in relation to the outlet part of a companion fitting and further I can relatively vary the respective location of the outlet or outlet parts with respect to each other. This can be accomplished without the use of a great multiplicity of specially dimensioned fittings or supplementary fittings. While for simplicity of illustration and explanation I have shown two fittings it is obvious that a greater number could be provided for variable interrelation and that also the configuration and kind of interrelated fittings could also be varied. By the term "fitting" I refer to a part suitable for use in a conduit system through which conductors pass from one duct or conduit of the system to another extension duct or conduit part, or section or to another element which receives the conductors passing through the fitting.

What I claim is:

1. In an electrical conduit system having apertured fittings which are to be aligned and connected and inter-related to other apertured fittings, means integral with and upon the fittings to provide for a variable mating inter-relation of an adjacent pair of fittings with respect to each other, and means cooperating with the aforesaid mating means for connecting the adjacent fittings together.

2. A fitting for an electrical conduit system having lug-like extensions thereon, said extension upon one side of a given fitting being disposed at a different level with respect to the extension upon the other side of the same fitting for the purpose described and one extension being disposed upon one side of an imaginary transverse plan through the fitting and adjacent thereto, and the other lug-like extension being disposed upon the opposite side of said plane and substantially adjacent thereto.

3. A fitting for an electrical conduit system, said fitting having upon one side thereof a plurality of lug-like extensions which are disposed upon a common level and adjacent a transverse plane through the fitting, said fitting have upon the other side thereof another pair of lug-like extensions which are likewise disposed upon a common level and also adjacent the same transverse plane and upon the opposite side thereof with respect to the aforesaid extensions which common level is however out of level with the extensions upon the other side of the same fitting for the purpose described.

4. An electrical conduit system comprising fittings which receive conduits and including means for fixedly inter-connecting and aligning adjacent fittings, said means including provisions integral with and upon the fittings to provide for a multiplicity of variable position inter-relations of such fittings.

5. A fitting for an electrical conduit system comprising a body member having integral lug-like extensions thereon at each side of the fitting, said lug-like extensions having apertures therein providing for the inter-connection thereto of other fittings which may be disposed upon either side of the first mentioned fitting.

6. An electrical conduit system including a pair of fittings with integral lug-like extensions on one fitting to mate with mating integral lug-like extensions upon the other fitting, said lug-like extensions being so disposed as to provide for a variable lengthwise relation of the two fittings with respect to each other.

In testimony whereof I hereunto affix my signature.

L. ALAN SHARP.